(12) United States Patent
Moni et al.

(10) Patent No.: US 7,088,774 B1
(45) Date of Patent: Aug. 8, 2006

(54) MEDIA STREAM SYNCHRONIZATION

(75) Inventors: Shankar Moni, San Jose, CA (US); Ankur Varma, San Francisco, CA (US); John Allen Tardif, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 10/158,536

(22) Filed: May 29, 2002

(51) Int. Cl.
*H04N 7/12* (2006.01)

(52) U.S. Cl. ............ 375/240.16; 375/240; 375/240.01; 375/240.12

(58) Field of Classification Search ........... 375/240.01, 375/240, 240.12, 240.16; 709/231, 247; 345/536; 725/32, 33, 34, 35, 36
See application file for complete search history.

(56) References Cited

U.S. PATENT DOCUMENTS

| | | | | |
|---|---|---|---|---|
| 5,832,234 A | * | 11/1998 | Iverson et al. | 709/247 |
| 6,052,415 A | * | 4/2000 | Carr et al. | 375/240.12 |
| 6,208,361 B1 | * | 3/2001 | Gossett | 345/536 |
| 6,622,171 B1 | * | 9/2003 | Gupta et al. | 709/231 |

OTHER PUBLICATIONS

P.N. Tudor, "MPEG-2 Video Compression", Electronics & Communication Engineering Journal, Dec. 1995, 15 pages.
Byung-Tae Choi, Sung-Hee Lee and Sung-Jea Ko, "New Frame Rate Up-Conversion Using Bi-Directional Motion Estimation", IEEE Transactions on Consumer Electronics, vol. 46, No. 3, Aug. 2000, 7 pages.
Yen-Kuang Chen, Anthony Vetro, Huifang Sun and S.Y. Kung, "Frame-Rate Up-Conversion Using Transmitted True Motion Vectors", 6 pages.
Jenq-Neng Hwang, Tzong-Der Wu and Chia-Wen Lin, "Dynamic Frame-Skipping in Video Transcoding", 6 pages.
Paul Delogne, Laurent Cuvelier, Benoit Maison, Beatrice Van Caillie and Luc Vandendorpe, "Improved Interpolation, Motion Estimation, and Compensation for Interlaced Pictures", IEEE Transactions on Image Processing, vol. 3, No. 5, Sep. 1994, 10 pages.
Gerard de Haan, Paul W.A.C. Biezen, Henk Huijgen and Olukayode A. Ojo, "True-Motion Estimation with 3-D Recursive Search Block Matching", IEEE Transactions on Circuits and Systems for Video Technology, vol. 3, No. 5, Oct. 1993, 12 pages.

(Continued)

*Primary Examiner*—Allen Wong
(74) *Attorney, Agent, or Firm*—Lee & Hayes, PLLC

(57) ABSTRACT

A system and method of synchronizing a media stream involves determining urgency measures and favorability measures. An urgency measure relates to a degree by which a media stream is currently out of synchronization. A favorability measure indicates the disruptiveness or likely noticeability altering the media stream at a particular temporal point. As a media stream becomes more and more out of synchronization, the urgency factor increases, and the system looks for places in the media stream at which units such as video frames or audio samples can be added or subtracted to re-achieve synchronization. When the urgency measure is at lower values, the system selects only points in the media stream having relatively high favorability measures. When the urgency measure increases, the system selects points having relatively lower favorability measures.

52 Claims, 8 Drawing Sheets

OTHER PUBLICATIONS

Dong-Wook Kim, Jin-Tae Kim, In-Ho Ra and Yeon-Sung Choi, "A New Video Interpolation Technique Based on Motion-Adaptive Subsampling", IEEE 1999, 2 pages.

R.L. Kashyap and Shankar Moni, "Using the Residual Area Criterion for Signal Reconstruction from Noiseless and Noisy Samples", IEEE Transactions on Signal Processing, vol. 44, No. 3, Mar. 1996, 7 pages.

Eric Dubois, Gerard de Haan and Taiichiro Kurita, "Motion Estimation and Compensation Technologies for Standards Conversion", Signal Processing Image Communication No. 6, 1994, 4 pages.

Gerard de Haan and Paul W.A.C. Biezen, "Sub-Pixel Motion Estimation with 3-D Recursive Search Block-Matching", Signal Processing: Image Communciation No. 6, 1994, 11 pages.

* cited by examiner

MEDIA STREAM SYNCHRONIZATION

TECHNICAL FIELD

This invention relates to synchronizing one or more media streams such as continuously streamed audio and video.

BACKGROUND

Various types of information can advantageously be provided to users in streaming formats, in which the information is rendered as it is received. For example, television and radio stations typically broadcast signals that are rendered on a CRT and a speaker in real-time, as they are received.

In the computer environment, digital streaming media has become commonplace. Media types such as video and audio can be encoded in compressed formats and sent over network communications media or an airwave communications medium as sequences of streaming media units. In the case of video, the streaming media units correspond to sequential frames of video. In the case of audio, the streaming media units comprise sequential audio samples. Streaming makes it possible for requested time-based content to be viewed nearly immediately, instead of waiting until an entire piece of content is downloaded before initiating its playback.

Regardless of the particular type of media or streaming media format, the user-perceivable information encoded by a streaming media signal is often played or rendered at a speed that is determined by the rate that the media units are received. In some cases, the streaming units contain timestamps indicating relative times at which they are to be rendered. In the latter case, the source of the streaming data ensures that individual units are sent (and therefore received) at a rate that correlates with the timestamps. For purposes of the following discussion, the rate at which the media units are intended to be rendered will be referred to as the nominal rendering rate. Where timestamps are present, the nominal rendering rate will be determined by the timestamps. In other cases, the nominal rendering rate might be determined in other ways, such as by the rate at which the media units are received.

In many situations, the received streaming media units can be simply played at their nominal rate. In other situations, however, circumstances at the receiver dictate playback at a rendering rate that is different from the nominal rendering rate.

As an example, it might be the case that certain rendering hardware operates at a fixed playback rate, so that media units have to be presented at a frequency that differs from the nominal rendering rate. This might happen, for example, when rendering video frames to a fixed-frequency display. When this is the case, the situation can arise where new frames do not arrive fast enough to satisfy the fixed needs of the rendering hardware. Alternatively, frames might arrive too frequently. A similar situation might arise where time-stamped media units arrive more or less frequently than otherwise dictated by the timestamps.

There are other examples in which a received media stream might need to be rendered at a rendering rate that is different from the nominal rendering rate. One common situation is that of simultaneously receiving and rendering two media streams, such as an audio stream and a video stream that are to be synchronized. Another common situation is the simultaneous reception and rendering of first and second video streams on a common set of hardware-such as on a single CRT. This is sometimes referred to as "picture-in-picture." Although it might be possible in this situation to vary the refresh rate of the CRT to match the nominal rendering rate of the first video stream, any mismatch between the nominal rendering rates of the first and second video streams will be difficult to resolve. More specifically, the nominal rendering rate of the first video stream will dictate the actual rendering rate, and the nominal rendering rate of the second video stream might not match this actual rendering rate.

Another example arises in the context of video-on-demand systems. In systems such as this, it is advantageous to initiate a broadcast stream of a given media title at periodic, relatively small intervals. For example, a particular movie might be broadcast every five minutes, resulting in a number of different simultaneous streams of the same movie. Each viewer is then forced to watch one of the broadcast versions of the movie. Suppose, however, that a viewer attempts to begin viewing a movie at a point in time that precedes the next "beginning" of the broadcast version of the movie by an intermediate time, such as two minutes. In this case, it might be possible to initiate a dedicated media stream for this one viewer, and to speed the streaming media transmission and playback so that the viewer eventually catches up with one of the broadcast versions of the movie, at which point the dedicated media stream would no longer be needed. In this case, however, the nominal rendering rate might exceed the capabilities of the playback hardware, causing some of the content to be skipped. This would result in annoying anomalies in the rendered media.

Buffering is often used to compensate for short-term mismatches between reception rate and a desired or actual rendering rate. Received media units are inserted into the head of a memory buffer and rendered from the bottom of the memory buffer. If a mismatch persists for a relatively long period, however, the buffer can eventually overflow or be depleted, resulting in a disruption of the media playback.

SUMMARY

The system and techniques described herein allow a media stream to be synchronized with a desired or actual rendering rate while reducing noticeable disruptions or anomalies in the presented information. To accomplish this, the system repeatedly evaluates an urgency factor. The urgency factor is usually related to the degree by which the received media stream is unsynchronized, and in some systems can be determined as a function of the immanency of stream buffer underflow or overflow.

In addition, the system repeatedly determines favorability measures corresponding to temporal points in the received media stream. Each favorability measure indicates the relative favorability of altering the received media stream at the corresponding point. At more favorable points, the stream can be altered to achieve synchronization with relatively fewer or less significant noticeable anomalies or irregularities in the presented media stream. At less favorable points, it might be possible to alter the media stream in a way that brings it closer to synchronization, but doing so would cause more noticeable disruptions in the rendered media stream.

The system then selects points at which to alter the media stream, based on both the urgency factor and the favorability measures. If there is low urgency, the system can wait for more favorable points at which to alter the media stream to achieve synchronization. As the urgency increases, however, the system intervenes at less favorable points.

In the case of a video stream, alteration normally involves removing frames from the stream or adding frames to the stream. In the case of an audio stream, alteration might involve adding or removing audio samples from the stream. There are various different ways in which such alterations can be accomplished.

BRIEF DESCRIPTION OF THE DRAWINGS

The same reference numerals are used throughout the drawings to reference like components and features.

DETAILED DESCRIPTION

Exemplary Media Processing and Rendering Environment

Figure 1:
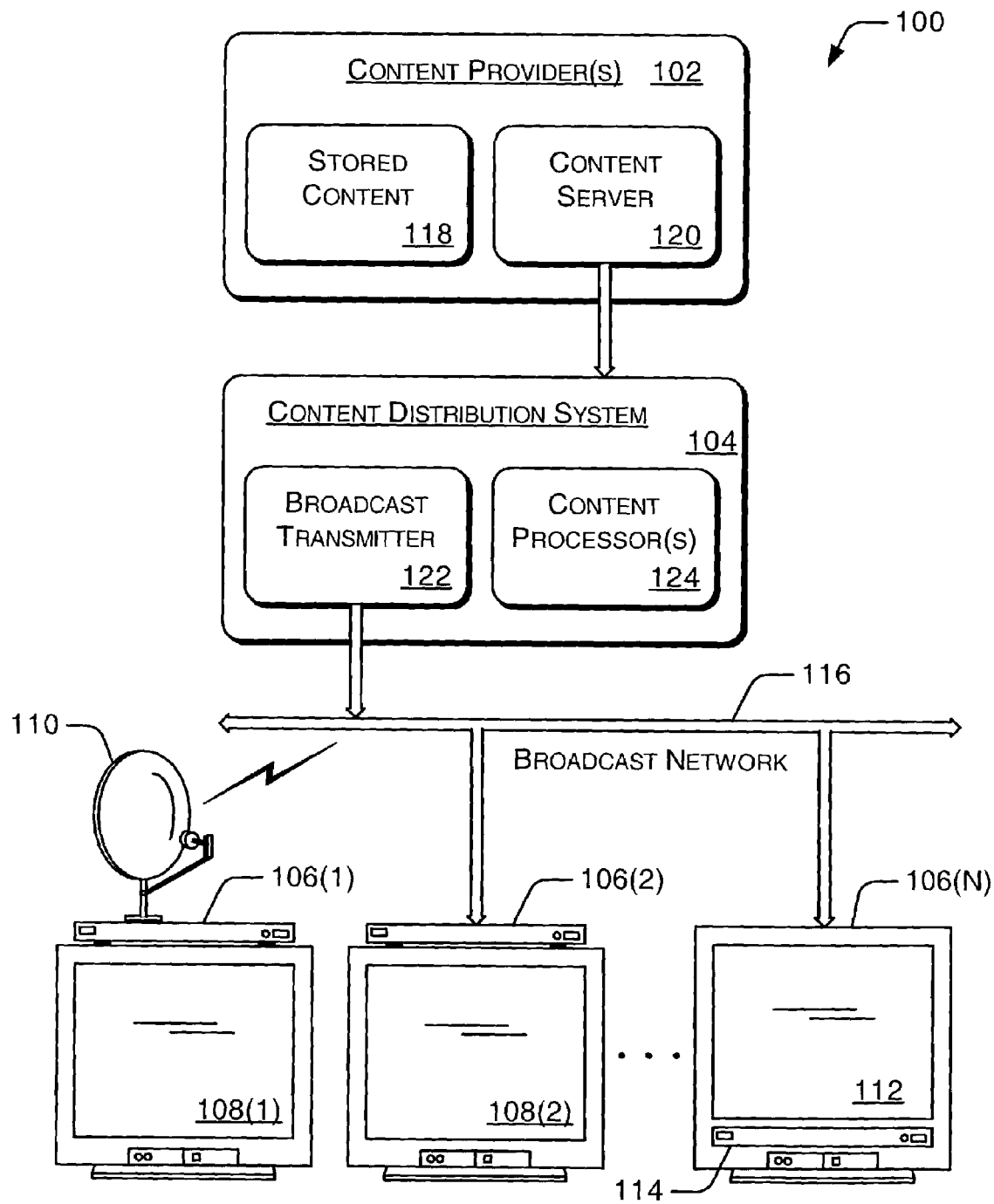
FIG. 1 illustrates an exemplary environment in which the methods and systems described herein may be implemented.

FIG. 1 illustrates an exemplary environment 100 in which the methods and systems described herein may be implemented. One or more content providers 102 include stored content 118 and a content server 120. Content server 120 controls the movement of content (including stored content 118) from the content provider 102 to a content distribution system 104, which is coupled to the content provider. Additionally, the content server 120 controls the movement of live content (e.g., content that was not previously stored by the content provider) and content stored at other locations to the content distribution system.

The content distribution system 104 contains a broadcast transmitter 122 and one or more content processors 124. Broadcast transmitter 122 broadcasts signals (e.g., cable television signals) across a broadcast network 116, such as a cable television network. Broadcast network 116 may include wired or wireless media using any broadcast format or broadcast protocol. Content processor 124 processes the content received from content provider 102 prior to transmitting the content across the broadcast network 116. A particular content processor may encode or otherwise process the received content into a format that is understood by multiple client devices 106 coupled to the broadcast network 116. Although FIG. 1 shows a single content provider 102 and a single content distribution system 104, a particular environment may include any number of content providers coupled to any number of content distribution systems.

A client device 106(1) receives broadcast content from a satellite-based transmitter via a satellite dish 110. Client device 106(1) is also referred to as a set-top box, game console or a satellite receiving device. Client device 106(1) is coupled to a television 108(1) for presenting the content received by the client device (i.e., audio data and video data) as well as a graphical user interface. A particular client device 106 may be coupled to any number of televisions 108. Similarly, any number of client devices 106 may be coupled to a television 108. Another client device 106(2) is coupled to receive broadcast content from broadcast network 116 and provide the received content to a television 108(2). Another client device 106(N) is a combination of a television 112 and a set-top box 114. In this example, the various components and functionality of the set-top box are incorporated into the television, rather than using two separate devices. The set-top box incorporated into the television may receive broadcast signals via a satellite dish (similar to satellite dish 110) and/or via broadcast network 116. In alternate embodiments, client devices 106 may receive broadcast signals via the Internet or any other broadcast medium.

Figure 2:
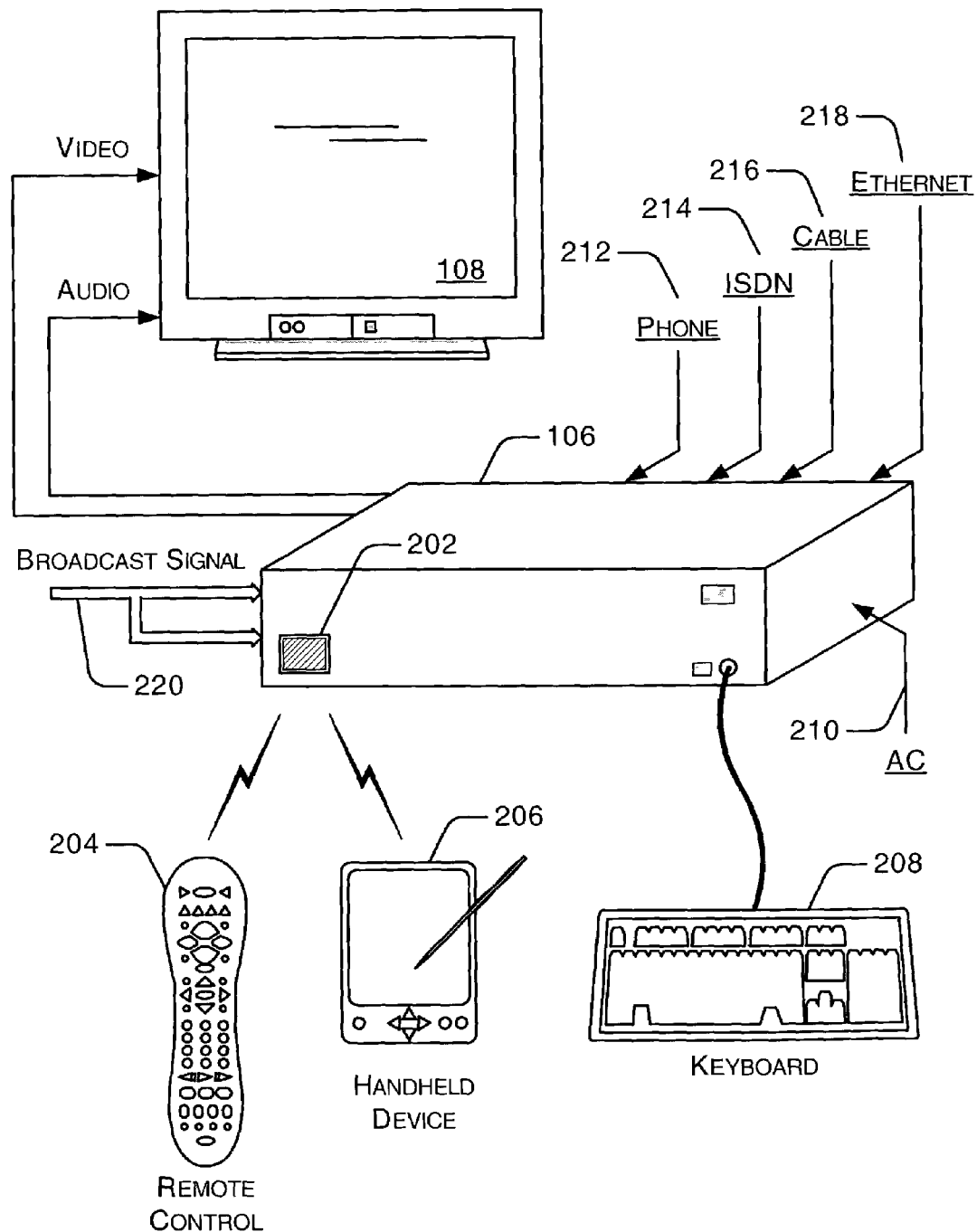
FIG. 2 is a block diagram of an example client device, a television, and various input devices that interact with the client device.

FIG. 2 is a block diagram of an example client device 106, television 108, and various input devices that interact with the client device. As discussed above, client device 106 may also be referred to as a set-top box, game console or a satellite receiver.

Client device 106 includes a wireless receiving port 202 (e.g., an infrared (IR) wireless port) for receiving wireless communications from a remote control device 204, a handheld device 206 (such as a personal digital assistant (PDA) or handheld computer), or other wireless device, such as a wireless keyboard. Additionally, a wired keyboard 208 is coupled to client device 106 for communicating with the client device. In alternate embodiments, remote control device 204, handheld device 206, and/or keyboard 208 may us an RF communication link (or other mode of transmission) to communicate with client device 106.

Client device 106 receives one or more broadcast signals 220 from one or more broadcast sources (e.g., from a broadcast network or via satellite). Client device 106 includes hardware and/or software for receiving and decoding broadcast signal 220, such as an NTSC, PAL, SECAM or other TV system video signal, and providing video data to the television 108. Client device 106 also includes hardware and/or software for providing the user with a graphical user interface by which the user can, for example, access various network services, configure the client device 106, and perform other functions.

Client device 106 receives AC power on line 210. Client device 106 is capable of communicating with other devices via a conventional telephone link 212, an ISDN link 214, a cable link 216, and an Ethernet link 218. A particular client device 106 may use any one or more of the various communication links 212–218 at a particular instant. Client device 106 also generates a video signal and an audio signal, both of which are communicated to television 108. The video signals and audio signals can be communicated from client device 106 to television 108 via an RF (radio frequency) link, S-video link, composite video link, component video link, or other communication link. Although not shown in FIG. 2, a particular client device 106 may include one or more lights or other indicators identifying the current status of the client device. Additionally, a particular client device 106 may include one or more control buttons or switches (not shown) for controlling operation of the client device.

Figure 3:
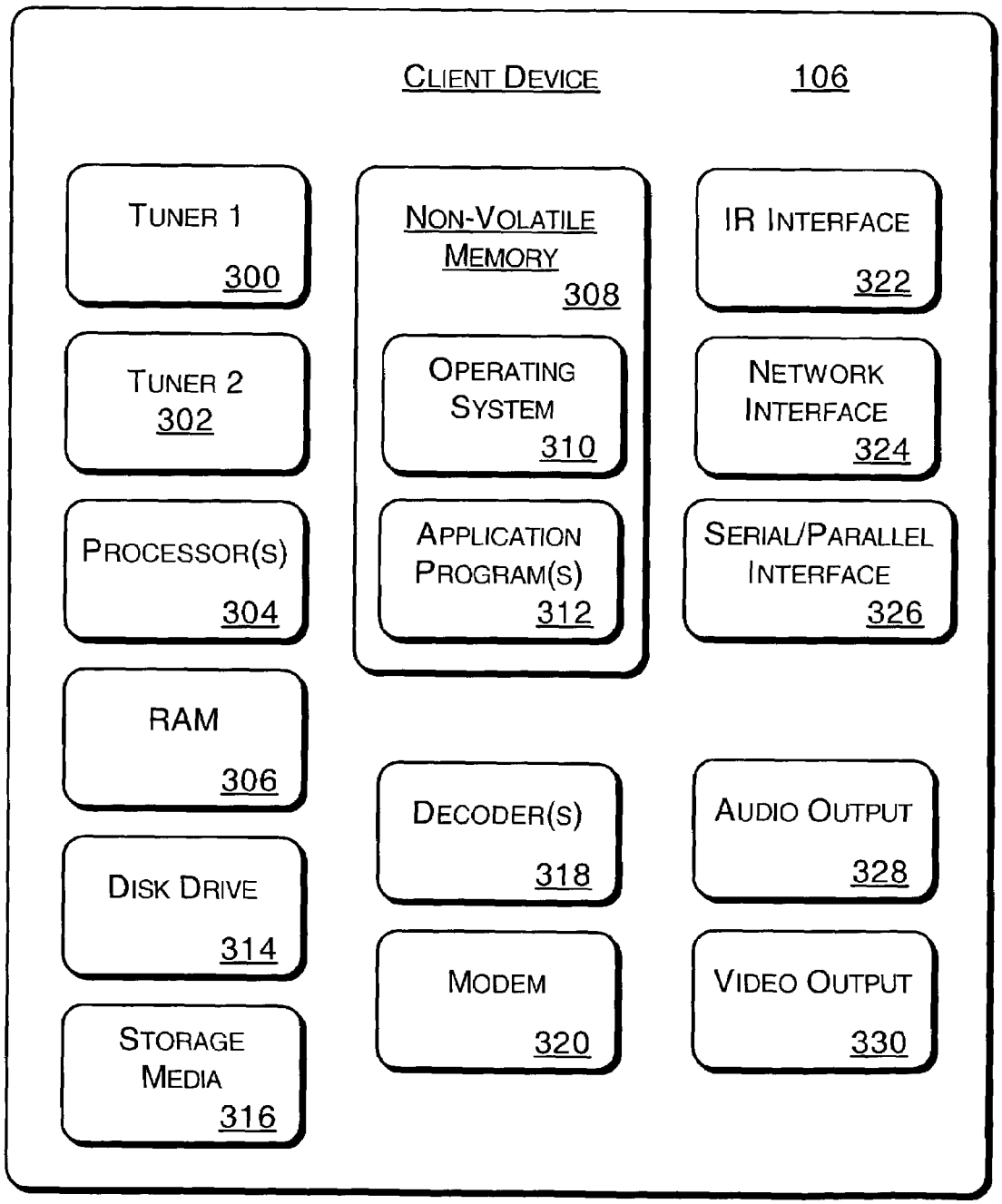
FIG. 3 is a block diagram of selected components of the client device shown in FIGS. 1 and 2.

FIG. 3 is a block diagram of selected components of the client device 106 shown in FIGS. 1 and 2. Client device 106 includes first and second tuners 300 and 302, one or more processors 304, and computer readable storage media. In this example, the computer-readable storage media comprises primary random access memory (RAM) 306, secondary non-volatile memory 308 such as a hard disk, a removable disk drive 314 and associated removable storage media 316. Although client device 106 is illustrated having various different types of computer-readable media, a particular implementation may include only one of the memory components, or might include other types of memory components. Additionally, although not shown, a system bus typically couples together the various components within client device 106.

Much of the functionality of client device 106 is embodied or enabled by computer-executable instructions, such as program modules, that are stored in one or more of the available types of computer-readable storage media, and that are retrieved and executed by processor(s) 304. The instructions and/or program modules are stored at different times in the various computer-readable media that are either part of the device or that can be read by the device. Programs are typically distributed, for example, on floppy disks, CD-ROMs, DVD, or some form of communication media such as a modulated signal. From there, they are installed or loaded into the secondary or non-volatile memory of a device, such as the device's hard disk. At execution, they are loaded at least partially into the primary electronic memory. The invention described herein includes these and other various types of computer-readable media when such media contain instructions, programs, and/or modules for implementing the steps and actions described below in conjunction with microprocessors or other data processors. The invention also includes the device itself when programmed according to the methods and techniques described above.

Portions of functionality described herein may also be implemented in hardware or a combination of hardware, software, and/or firmware. For example, one or more application specific integrated circuits (ASICs) or programmable logic devices (PLDs) could be designed or programmed to implement one or more portions of the functions described below.

Client device 106 also includes a decoder 318, such as an MPEG decoder that decodes MPEG-encoded signals. MPEG (Moving Pictures Experts Group) is a standard for digital video and digital audio compression. MPEG-2 is a particular version of this standard, which supports a variety of audio/video formats including legacy TV, HDTV (High-Definition Television), and five channel surround sound. Other types of encoding might be substituted for MPEG encoding in certain implementations.

Client device 106 includes a modem 320 that allows client device 106 to communicate with other devices via a conventional telephone line. An IR interface 322 allows client device 106 to receive input commands and other information from a user-operated device, such as a remote control device or an IR keyboard. Client device 106 also includes a network interface 324, a serial/parallel interface 326, an audio output 328, and a video output 330. Interfaces 324 and 326 allow the client device 106 to interact with other devices via various communication links. Although not shown, client device 106 may also include other types of data communication interfaces to interact with other devices. Audio output 328 and video output 330 provide signals to a television or other device that processes and/or presents the audio and video data. Although client 106 is illustrated having multiple interfaces, a particular client may include only one or two of such interfaces.

Client device 106 also includes a user interface (not shown) that allows a user to interact with the client device. The user interface may include indicators and/or a series of buttons, switches, or other selectable controls that are manipulated by a user of the client device.

Although client device 106 is depicted in this embodiment as a set-top box operating in conjunction with a traditional television set, the particular techniques described below are not limited to this environment. Specifically, many of the components illustrated in FIGS. 1–3 can be considered optional-different implementations will have differences in their specific components and capabilities. Furthermore, the described techniques are applicable to and can be implemented within many different environments in which it is desired to synchronize a received media stream with another stream, a clock, or some other reference that does not necessarily correspond to the nominal rendering rate of the media stream.

For example, the techniques described below can be implemented within various different general purpose or special purpose computing system configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments, entertainment systems.

Media Stream Synchronization

Figure 4:
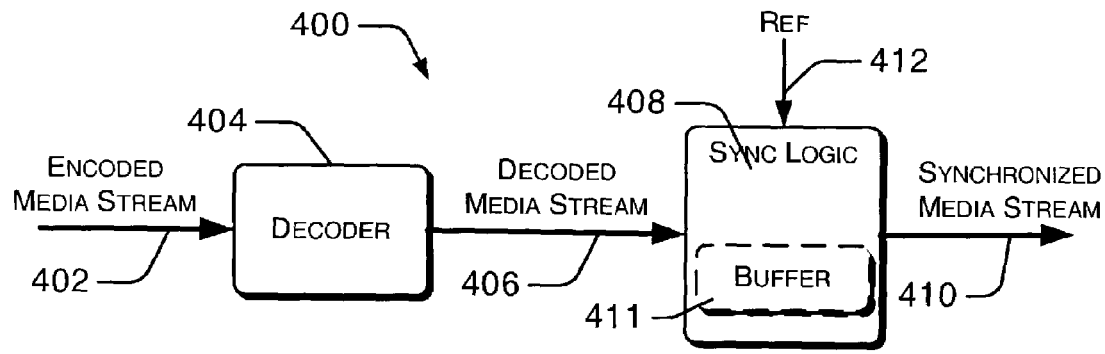
FIG. 4 is a block diagram showing logical components of a system for synchronizing a media stream.

FIG. 4 illustrates pertinent logical components of a video processing system 400 that might be implemented using the system described above. In this example, system 400 receives a single media stream 402. A rendering component 404 receives the media stream 402 and converts it to a format for presentation to a user. For example, the rendering component might comprise a television tuner that demodulates a signal and converts it to an NTSC format. Alternatively, such a television tuner might demodulate a signal and in response produce a digital CRT control signal to drive a digital monitor or CRT. The rendering component might alternatively comprise a decoder such as an MPEG video or audio decoder which receives a digitally encoded data stream and processes it in some way to make it more suitable for use by components that drive a rendering device such as a visual monitor or speaker, producing a decoded media stream 406. Specifically, such an MPEG decoder might decode sequential video frames to produce a decoded video output or sequential audio samples to produce a decoded audio output. Although the system is described as an audio and/or video system, other types of media streams can also be synchronized using the techniques described herein.

The system of FIG. 4 includes synchronization logic 408. Synchronization logic 408 receives decoded media stream 406 and produces a synchronized decoded media stream 410. Synchronization logic 408 may or may not have an internal buffer 411 for buffering received media units.

Synchronization logic 408 is responsive to an externally supplied reference clock or signal 412 that determines the stream output rate of synchronization logic 408. In the described example of a video stream, reference 412 establishes the actual rendering rate at which decoded video frames are output from synchronization logic 412.

As already described, encoded media stream 402 and decoded media stream 406 potentially have a nominal rendering rate different from the actual rendering rate established by reference 412. As already discussed, the nominal rendering rate can be established by the reception rate of media units or by timestamps associated with the media units.

Synchronization logic 408 alters the media stream to maintain synchronization with reference 412. In the simplest case, this is accomplished by simply omitting units from or adding duplicate units to the media stream. For example, if decoded media stream 406 is providing decoded units to synchronization logic 408 at a rate that is faster than that established by reference 412, certain units are selectively dropped from the decoded media stream to produce a synchronized video stream 410. If on the other hand units are not arriving as fast as the rate established by reference 412, duplicate units are added at selected points within the media stream to produce synchronized media stream 410. More complex techniques for altering the a video stream or an audio stream to achieve synchronization will be described below.

In order to determine whether units need to be added to or deleted from the video stream, synchronization logic 408 repeatedly evaluates the degree by which the actual rendering of the incoming media stream is out of synchronization with its nominal rendering rate. The quantification of this degree is referred to herein as an "urgency measure," and its calculation will be described in more detail as the discussion proceeds.

In addition, synchronization logic 408 repeatedly determines favorability measures corresponding to different temporal points or units in the media stream. Each favorability measure indicates the relative favorability of altering the media stream at the corresponding point. In the described embodiments, the favorability measure indicates whether a stream alteration at the corresponding point is likely to be relatively noticeable to a viewer or listener of the rendered media stream. A high favorability measure indicates that the stream can be altered at the corresponding point with minimal noticeable effects in the rendered media. A low favorability measure indicates that an alteration of the stream at the corresponding point will likely produce a relatively noticeable effect or disruption in the rendered media.

With respect to video streams, the favorability of altering the media stream at any given point might relate to whether a viewer will be likely to perceive such an alteration, or if the alteration is perceivable, to how disruptive the alteration will be to the viewing experience. For example, black or blank frames might be present in a video stream as transitions between scenes; such black frames would present favorable points at which to add or subtract frames without significant effect on the viewed presentation. Other scene changes might also present favorable opportunities, even without the presence of black frames. Periods of relatively low motion might present other favorable opportunities for altering a video stream.

With respect to audio streams, the favorability of altering the media stream at any given point might be similarly related to whether a listener will be likely to perceive such an alteration, or if the alteration is perceivable, to how disruptive the alteration will be to the listening experience. Periods of relative silence are favorable points at which to alter the audio stream.

More specific methods of determining favorability measures will be described below.

As needed, synchronization logic 408 selects points in the media stream at which to alter the media stream. Such alteration is performed in a manner that reduces the degree by which the actual rendering of media stream is out of synchronization from its nominal rendering rate. As mentioned, in the case of a video stream such alteration can comprise adding to or reducing the number of frames in order to achieve synchronization. In the case of an audio stream, the alteration can comprise adding to or reducing the number of audio samples.

Synchronization logic 114 selects the alteration points based on both the urgency measure and the favorability measures. When the urgency measure is low, synchronization logic 114 selects only those temporal points in the media stream having relatively high favorability measures. As the urgency measure increases, synchronization logic 114 selects temporal points having lower favorability measures.

Mathematically, one way to implement this selection procedure is to evaluate the mathematical value U*F at the various temporal points, where U represents the urgency measure and F represents the favorability measure, and to perform alterations at points where this ratio exceeds a predetermined threshold.

Another method is to perform alterations at points selected on the basis of having corresponding favorability measures that satisfy a variable favorability threshold. The favorability threshold is increased at lower urgency measures, and decreased with higher urgency measures.

Figure 5:
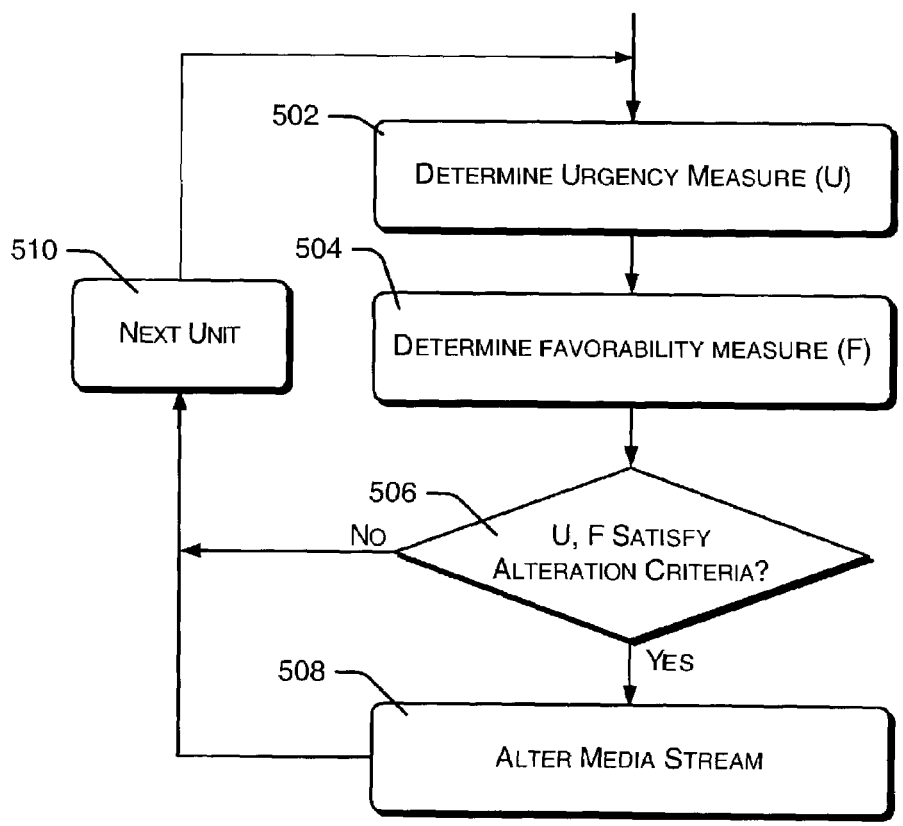
FIG. 5 is a flowchart illustrating actions performed in the system of FIG. 4 for synchronizing a media stream.

FIG. 5 illustrates a method of synchronizing a received media stream. Assuming a current media stream unit, an action 502 comprises determining an urgency measure corresponding to the temporal point within the media stream corresponding to that media unit. As mentioned above, the urgency measure indicates the degree by which the rendering of the received media stream is out of synchronization. As a specific example, the urgency factor might comprise a function such as $U=a \cdot t_s$, where a is a suitable constant and $t_s$ is the time by which the actual rendering of the media stream is out of synchronization with its nominal rate.

If synchronization logic 408 includes a buffer 411, determining the urgency measure might involve evaluating the condition of the buffer. Specifically, the urgency factor might be derived from an estimation of the time remaining until buffer overflow or underflow. For example, the urgency factor might comprise a function such as $U=a(M-t_B)$ where a is a suitable constant, $t_B$ is the time remaining until buffer overflow or underflow, and M is the maximum value that U is allowed to attain. The urgency factor might also be calculated as a function of the number of media units currently contained in buffer 411.

An action 504 comprises determining a favorability measure indicating the relative favorability of altering the received media stream at the point of the current media unit. Suitable methods of determining favorability measures will be discussed in more detail below.

An action 506 determines whether the media stream should be altered at the temporal point corresponding to the current media unit based on both the urgency measure and the favorability measure. As mentioned above, one way to make this determination is to evaluate whether the favorability measure satisfies a variable favorability threshold, where the variable favorability threshold is derived from or calculated based on the urgency measure. When using this method, action 506 comprises calculating the variable favorability threshold based on the urgency measure, wherein the favorability threshold is lowered as the urgency measure increases and is raised as the urgency measure decreases. Action 506 then further comprises comparing the favorability measure to the calculated variable favorability threshold. In other embodiments, this entire process can potentially be integrated into a single mathematical operation, such as computing an urgency/favorability value based on both the urgency and favorability measures, and comparing this value to a fixed threshold.

If it is determined in action 506 that the media stream should be altered, such alteration is performed in an action 508. The alteration is performed in a manner that reduces the degree by which the rendering of the media stream is out of synchronization. In the embodiments described herein, this might involve adding to or subtracting from the number of media units in the media stream. After action 508, or after action 506 if no alteration is performed, processing shifts in an action 510 to the next or a subsequent media unit of the media stream and the above steps are repeated with respect to this media unit.

Figure 6:
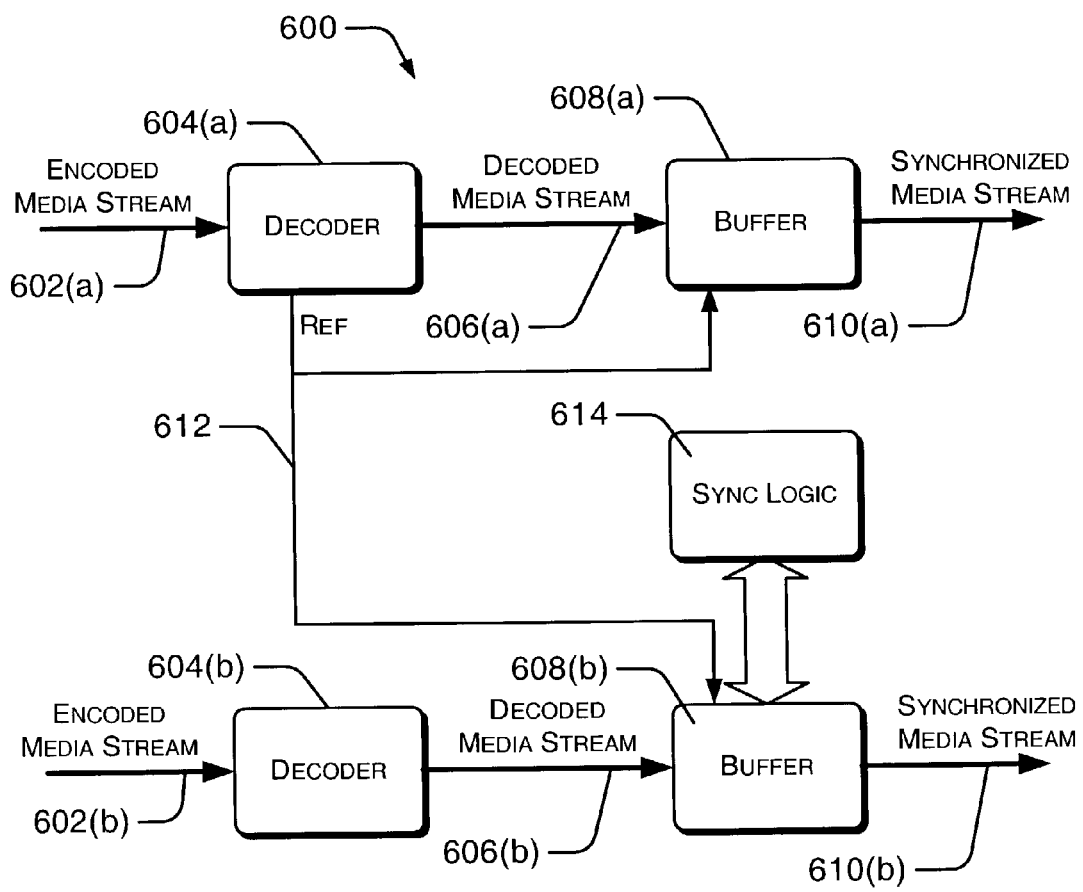
FIG. 6 is a block diagram showing logical components of a system for synchronizing two media streams.

FIG. 6 shows logical components of an embodiment of a media processing system 600 that receives and renders first and second encoded media streams 602(a) and 602(b), respectively. The media streams might be a pair of video streams where one of the media streams is to be rendered within the other as a picture-in-picture. Alternatively, the media streams might comprise a video stream and an audio stream that are to be synchronized. Yet other alternatives are also possible.

In this example, the consecutive units of the media streams are received by rendering components 604(a) and 604(b), which decode the media streams to produce decoded media streams 606(a) and 606(b). As in the previous example, the rendering components 604(a) and 604(b) might comprise demodulating tuners, data decoders, and or other components that receive media streams and process them to produce signals and/or data that are formatted more appropriately for driving a presentation device such as a visual display, speaker, or other device.

The system shown in FIG. 6 includes buffers 608(a) and 608(b) that receive and buffer decoded media streams 606(a) and 606(b), respectively, to produce buffered, synchronized media streams 610(a) and 610(b). Media units are buffered as they are received from decoded media streams 606(a) and 606(b). The nominal rendering rates of the two streams potentially vary from each other. However, media units are retrieved and rendered from buffers 508(a) and 508(b) at a common rendering rate. In other words, the actual rendering rate is the same for each of the two media streams.

In many cases, the actual rendering rate will correspond to the reception rate or nominal rendering rate of one of the media streams. In the specific example shown in FIG. 6, the actual rendering rate is based on the nominal rendering rate—the reception rate or timestamped rate—of the first encoded media stream 602(a). Thus, a logical reference signal or clock 612, representing the nominal rendering rate of media stream 602(a), controls the actual rendering rate—the rate at which media units are removed and rendered from buffers 608(a) and 608(b). In a system such as this, synchronization involves synchronizing the second media stream to the first media stream.

System 600 includes synchronization logic 614 that monitors and evaluates the content of buffer 608(b) in order to synchronize its output stream 610(b) with reference 612. In order to synchronize the output of buffer 608(b), synchronization logic 614 alters the content of buffer 608(b) in a manner that reduces the degree by which it is out of synchronization with reference 612 and media stream 610(a). In most cases, this comprises adding or subtracting media units to or from buffer 608(b).

Figure 7:
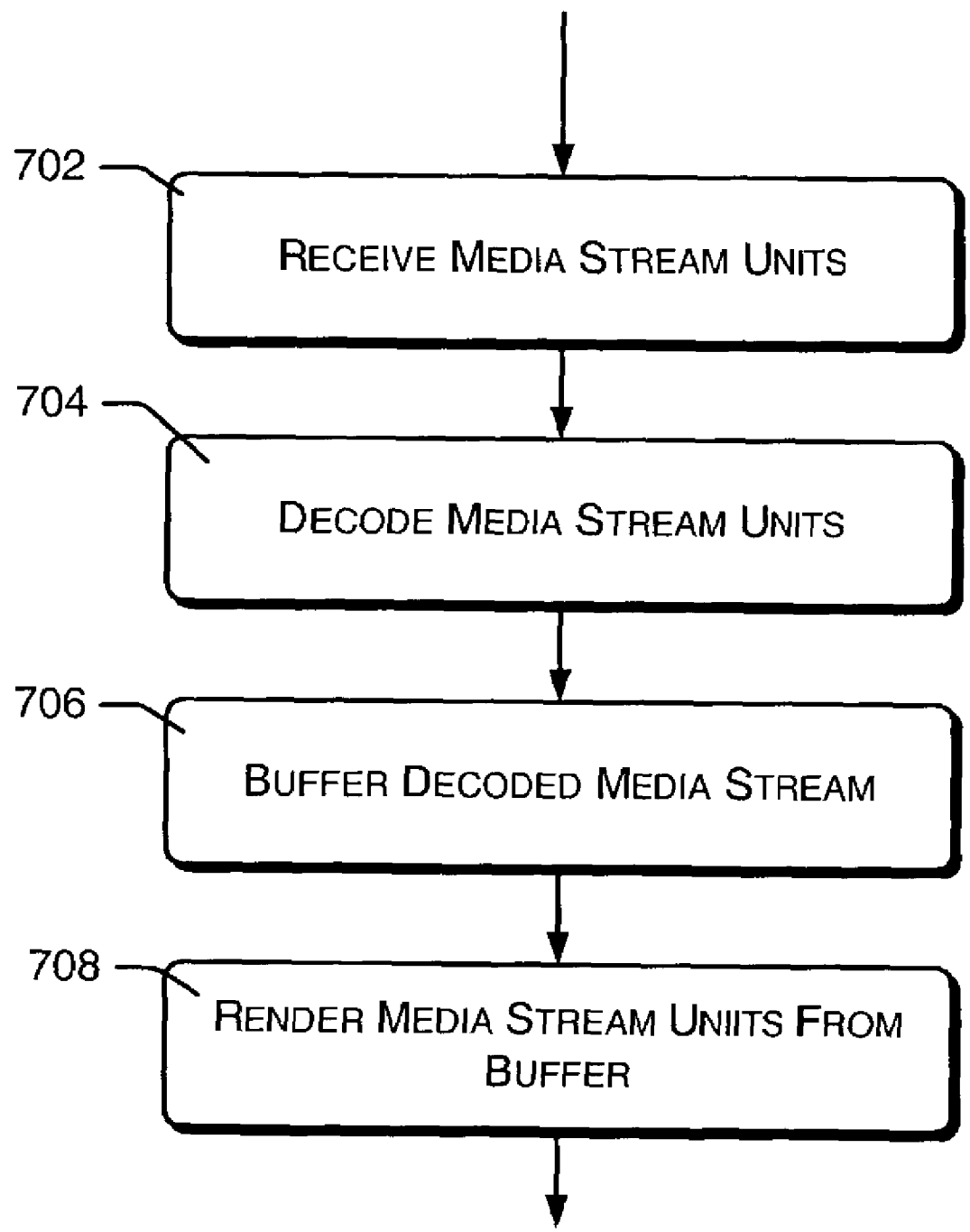
FIGS. 7 and 8 are flowcharts illustrating actions performed in the system of FIG. 6 for synchronizing two media streams.
Figure 8:
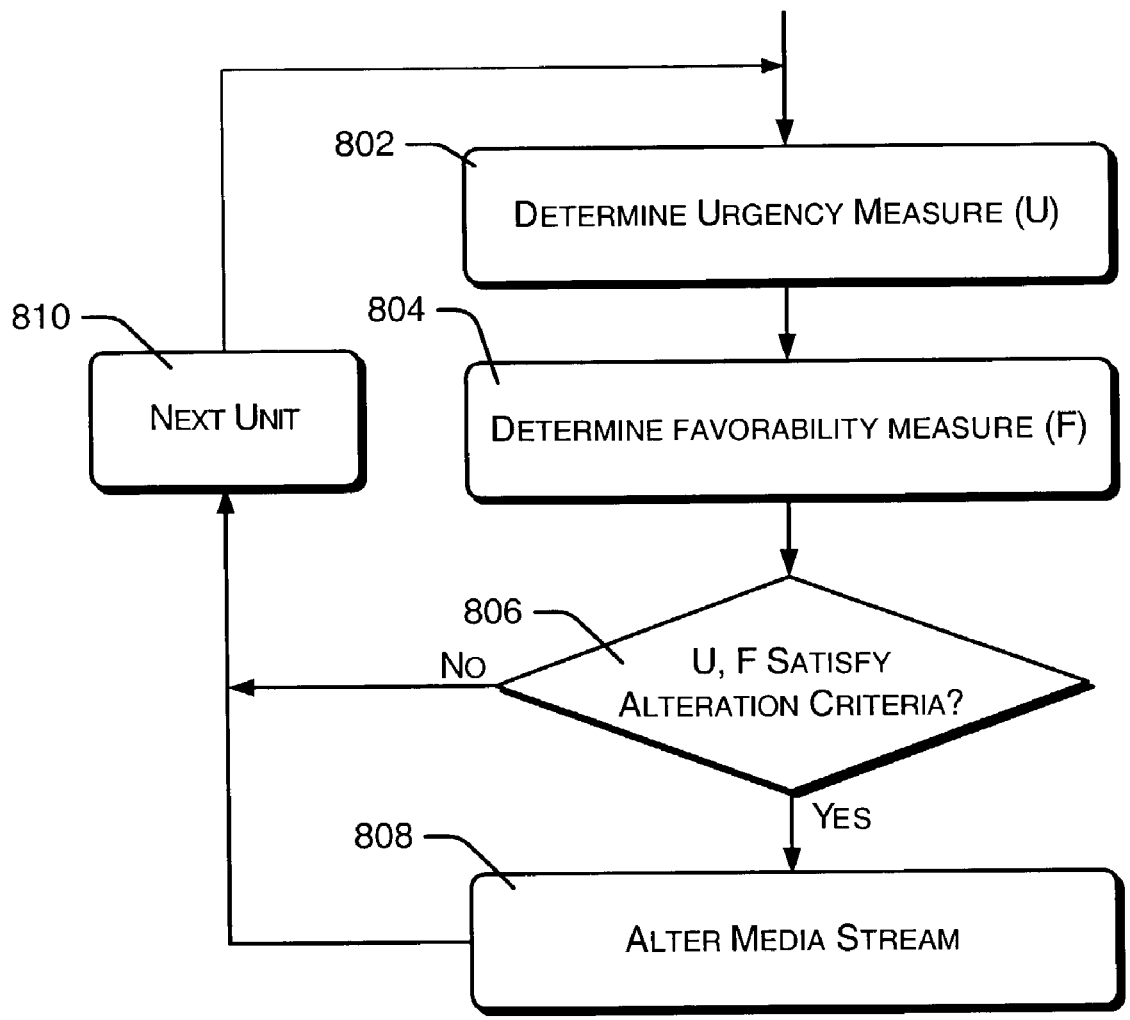

FIGS. 7 and 8 show actions performed by the logical system shown in FIG. 6. Referring first to FIG. 7, an action 702 comprises receiving sequential encoded media stream units such as video frames or audio samples of first and second encoded media streams 602(a) and 602(b), at first and second nominal rendering rates, respectively. An action 704 comprises decoding or otherwise processing the received media streams 602(a) and 602(b) to produce corresponding decoded media streams 606(a) and 606(b). An action 706 comprises buffering the respective decoded media streams 606(a) and 606(b) in buffers 608(a) and 608(b), respectively, prior to rendering them. An action 708 comprises rendering the sequential units of the first and second media streams at a single, common, actual rendering rate, which for purposes of this example corresponds to the first nominal rendering rate of first encoded media stream 602(a)—as indicated by reference signal 612. The actual rendering rate is potentially different than the nominal rendering rate.

Referring now to FIG. 8, illustrating actions performed contemporaneously with those of FIG. 7, an action 802 comprises determining an urgency measure indicating a degree by which the actual rendering of the first and second media streams are out of synchronization, or by which the rendering of the respective media streams are out of synchronization with their nominal rendering rates. In the embodiment of FIG. 6, where the media streams are buffered, this action can be based on an evaluation of how many units of the respective media streams are currently buffered. More specifically, this action might comprise evaluating how close the buffers are to either an underflow or overflow condition. The closer to one of these conditions, the higher the urgency measure will be.

An action 804 comprises evaluating one or more media units of at least one of the media streams to determine a favorability measure corresponding to a temporal point in that media stream. In the embodiment of FIG. 6, this action involves evaluating buffered media units of second media stream 602(b)—media units that are currently buffered in buffer 608(b). Each favorability measure indicates the relative favorability of altering the media stream at the corresponding point.

An action 806 determines whether the second media stream buffered in buffer 608(b) should be altered at the temporal point corresponding to the favorability measure determined in action 804. This determination is based on both the urgency measure and the favorability measure. If it is determined in action 806 that the media stream should be altered, such alteration is performed in an action 808—the media units in buffer 608(b) are altered to either increase or decrease the number of buffered media units in a manner that tends to reduce the urgency measure. After action 808, or after action 806 if no alteration is performed, processing shifts in an action 810 to the next or a subsequent media unit of the media stream and the above steps are repeated with respect to current buffer conditions and a different, subsequent media unit.

The actions shown in FIG. 8 effectively select points in the second media stream at which to alter the media stream, and then alter the media stream at the selected points in a manner that reduces the degree by which the rendering second media stream is out of synchronization with its nominal rate.

Figure 9:
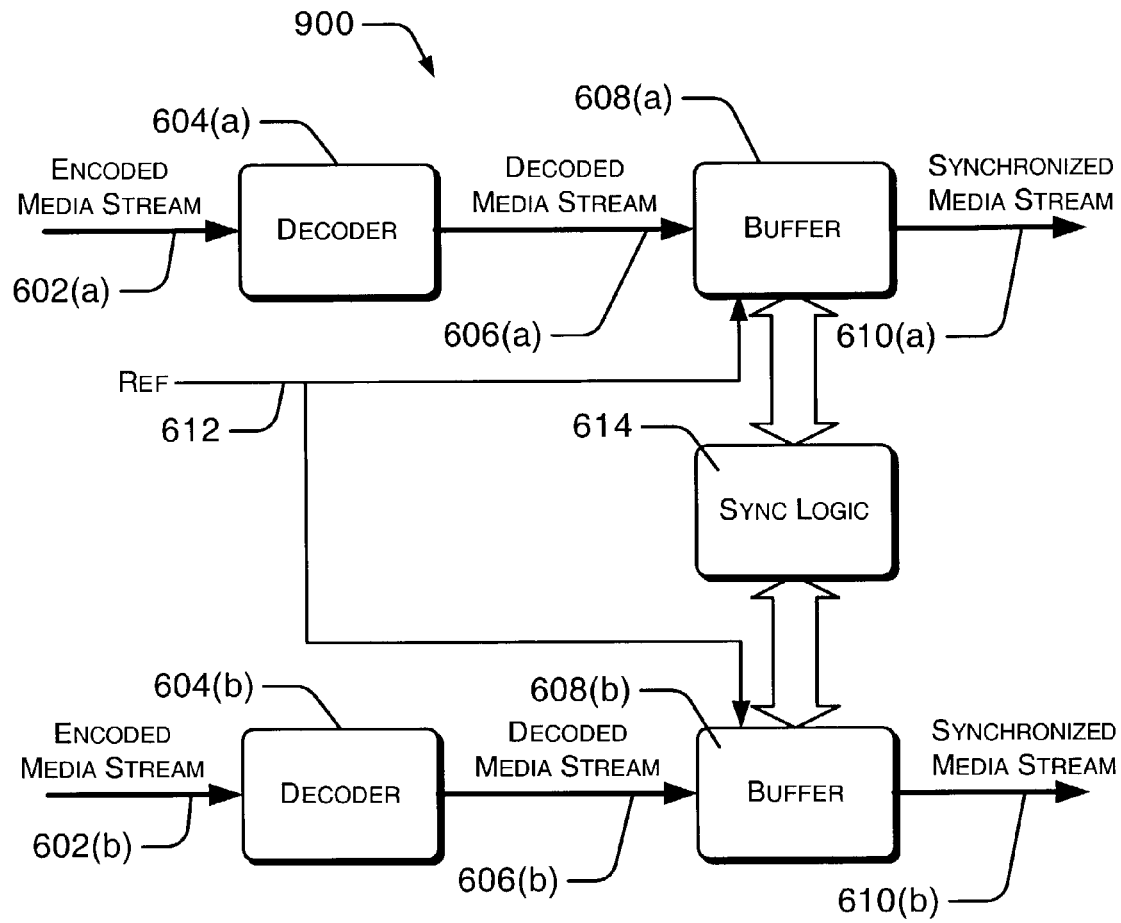
FIG. 9 is a block diagram showing logical components of an alternative system for synchronizing two media streams.

FIG. 9 illustrates a video processing system 900 similar to that shown in FIG. 6, except that reference signal 612 is independent of either of the two media streams. In addition, synchronization logic 614 monitors the conditions of both buffers 608(a) and 608(b) and determines urgency measures corresponding to each of the media streams. Favorability measures are also calculated for each of the media streams, and alterations are performed in both buffers 608(a) and 608(b) at points selected based on the urgency measures and the favorability measures. The alterations are performed to add or subtract media units from the buffers in a manner that reduces the amount by which they are out of synchronization with their nominal rendering rates. If, for example, one of the buffers is tending toward an overflow, media units are subtracted from the buffer. If the buffer is tending toward an underflow, media units are added to the buffer. Similar alterations are performed as needed to the buffered media units of the other buffer.

Note that in some situations, when synchronizing two or more media streams in this manner described with reference to FIGS. 6–9, it might be possible to dynamically select which of the media streams will be altered to achieve synchronization. In cases such as these, it is advantageous to select the media stream that currently has the best favorability measure. This might change from one stream to another during the course of rendering a particular media stream.

Determining Urgency

As discussed above, one method of determining an urgency factor involves simply monitoring the level of the stream buffer and/or the predicted time until a buffer overflow or underflow. In other situations, it might be desirable to determine urgency measures in different ways.

For example, it might be desirable to evaluate urgency as a function that relates the current degree of synchronization to the time between sequential media units. More specifically, the urgency measure may be calculated in a manner such that it increases exponentially as the degree by which the media stream is out of synchronization approaches the nominal amount of time between sequential media units—for example the nominal frame time. Mathematically, this might be expressed as $$\frac{a}{(t_0 - t)}$$

where a is a constant, $t_0$ is the inter-unit time or frame time, and t is the actual time by which the rendering of the media stream is out of synchronization. In the case where a reference time is established by timestamps accompanying the media units, such as in an MPEG media stream, the value t is determined by comparing the actual rendering time of a media unit with the rendering time indicated by the timestamp of the media unit.

As an alternative, the urgency measure can be based on the fraction of a unit or frame time by which the current frame is out of synchronization-such as by $U=t/t_0$, where t is the actual time by which the rendering of the media stream is out of synchronization and $t_0$ is the inter-unit time or frame time.

In some cases, U might not be calculated as a continuous function. For example, it might be desirable to utilize the value $t/t_0$ in conjunction with fixed thresholds to yield a finite number of discrete urgency measures. As an example, any value of $t/t_0$ less than 0.3 might result in a "low" or "1" urgency measure. Any value of $t/t_0$ greater than 0.3 and less than 0.7 might result in a "moderate" or "2" urgency measure, and any value of $t/t_0$ greater than 0.7 might result in a "high" or "3" urgency measure.

Evaluating Favorability

There are a number of different ways in which favorability measures can be determined. As one example, the media streams themselves might be authored and encoded in such a way that they include favorability measures. In other words, an author of media content might include, in the media stream itself, indicators of temporal points within the media stream at which alterations can favorably be performed, and, optionally, the relative favorability of performing such alterations at those points. In this case, determining the favorability measure for any given point within a data stream might involve simply receiving the measures along with the media stream-essentially reading them from the media stream or from data associated with the media stream. In one implementation, the favorability measures might comprise true/false flags inserted in or associated with the media stream at points in the media stream where alteration would be most favorable. Alternatively, numeric favorability measures might indicate the relative favorability of altering the media stream at different points.

When favorability measures such as these are transmitted with a media stream, the determination of such points can in some cases be based on production data or information. For example, favorability measures accompanying a media stream might be placed at temporal points corresponding to scene changes, or to points corresponding to transitions to and from commercials. These are locations at which frames can usually be inserted or omitted with minimal perceivable disruption.

In some cases, ancillary data such as production data or information might be transmitted along with the media stream, and favorability measures might be determined from such ancillary data. For example, the ancillary data might include scene change indicators for certain frames of a video stream, indicating whether the frame is the first or last frame of a scene. Favorability can be determined by using this data to identify the locations of scene changes, which correspond to locations of relatively high favorability.

As another example of ancillary data, film content is often encoded in a media stream at twenty-four frames per second. When converting the media stream to sixty "fields" per second (as is often required for video rendering), received frames are often repeated in a prescribed manner known as "3-2 pull-down." When using this technique, for each pair of received frames the first received frame is used to generate three rendered fields and the second received frame is used to generate two rendered fields. However, it might be possible in certain cases to omit one or more of the additionally generated fields. Alternatively, it might be possible to perform an additional generation from a particular received frame. Thus, in one implementation, the encoded media stream includes ancillary data from which it can be determined whether or not one of these two alternatives can be favorably accomplished.

In other environments, determining favorability measures will comprise calculating them from the received media stream or from data associated with the received media stream. In the case of an MPEG video stream, certain MPEG data associated with the received media stream can be used to calculate favorability measures. The discussion below introduces a number of different MPEG parameters that may be used alone or in combination with other parameters to derive a favorability measure corresponding to a frame. Note that other parameters, in addition to those discussed, could also, or alternatively, be used.

An MPEG frame contains a number of pixel blocks. These blocks can be encoded using information from the frame itself or based on information from previous frames. A block encoded using information from the current frame is referred to as an intra-coded block. A block encoded using information from a previous frame is referred to as a non-intra-coded block. Each frame potentially has a number of intra-coded blocks and a number of non-intra-coded blocks.

MPEG encoding also utilizes macroblocks. Each macroblock comprises a combination of pixel blocks, representing different components of a frame having a spatial correspondence. For example, a macroblock might comprise corresponding luminance and chrominance data blocks.

A non-intra-coded block can potentially be at least partially defined by a motion vector. A motion vector is a two-dimensional vector that provides an offset from the coordinate position in the current frame to the coordinates in a previous, reference frame.

MPEG encoding makes use of DCT (discrete cosine transform) transformations. A two-dimensional DCT is performed on small blocks of a frame to produce blocks of DCT coefficients. The magnitude of each DCT coefficient indicates the contribution of a particular combination of horizontal and vertical spatial frequencies to the original picture block. Non-intra DCT coefficients are DCT coefficients that have been calculated by applying the DCT to the difference of the original block and the prediction obtained using the motion vectors.

Each frame can also be characterized by its bitrate—the number of bits per second, per frame, or per some other element of a video frame.

Based on the MPEG parameters described above, the following values can be used to calculate favorability parameters:

the sum of the magnitudes or absolute values of motion vectors in a frame;

the number of non-intra-coded blocks in the frame;

the sum of magnitudes or absolute values of non-intra DCT coefficients of the frame;

the number of macroblocks in the frame; and the bitrate of the frame.

In many cases, the favorability measure will be calculated based on at least two of these parameters. In some cases, the favorability measure will be calculated based on at least three of these parameters. In yet other cases, all of these parameters and others might be used to calculate a favorability measure. Some specific examples of favorability measures F are as follows, where the parameters indicated are those of a particular video frame:

$$F_1 = \frac{\text{(sum of magnitudes of motion vectors)}}{\text{(number of non-intra-coded blocks)}}$$

$$F_2 = \frac{\text{(sum of magnitudes of non-intra-coded } DCT \text{ coefficients)}}{\text{(number of non-intra-coded blocks)}}$$

$$F_3 = \frac{\text{(number of non-intra-coded blocks)}}{\text{(number of macroblocks)}}$$

In some implementations, the favorability parameters described above might be combined. For example, a composite favorability measure might be calculated as $F_C = F_1 + F_2 + F_3$. Alternatively, the individual parameters might be assigned weights, such as $F_C = aF_1 + bF_2 + cF_3$, where a, b, and c are appropriate constants that take into account the relative subjective importance of the three different measures.

Based on empirical evidence, the inventors have found that the favorability of altering a video stream at a given point decreases severely with the number of intra-coded blocks. Favorability decreases, but not so severely, with the sum of the magnitudes of the motion vectors of a frame or the number of non-zero motion vectors. A high bitrate, together with the presence of a large number of non-intra blocks, may indicate high motion, and therefore low favorability. Thus, one workable formulation of a favorability measure comprises a sum of the following three values:

$$\frac{a}{\text{(sum of magnitudes of motion vectors)}}$$

$$\frac{b}{\text{(number of intra-coded blocks)}} \text{ and}$$

$$c \cdot \text{bitrate}$$

where a, b, and c are appropriate constants that take into account the subjective importance of each of the three criteria.

With regard to audio streams, favorability measures can be based on characteristics of the media stream audio samples. One criteria relates to the amplitude of the current audio samples. Points of low or zero amplitude represent silence, and present points of high favorability-periods of silence can be shortened or lengthened without causing any significant noticeable effects. Another potential criteria relates to the Fourier Transform (FT) of the current audio sample or a series of audio samples surrounding the current sample. Specifically, a highly peaked FT represents harmonic sounds, which when stretched are easy to tell to the musically inclined ear. Thus, these points are not relatively favorable points for adding or subtracting samples. Non-peaked regions, on the other hand, represent favorable points at which to alter an audio stream.

Altering Media Streams for Synchronization

Once it is determined that alteration of a media stream should take place at a particular point, there are several ways this can be accomplished. Most simply, units, frames or samples can simply be dropped or deleted from the stream, or duplicate units, frames, or samples can be inserted.

Better results, however, can be achieved by using more complex methods. In a video stream, the number of frames can be decreased by replacing a first, plural number of frames with a second number of frames, where the second number is less than the first number.

Figure 10:
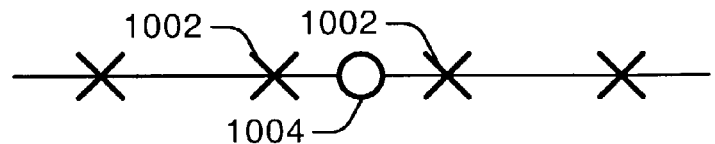
FIG. 10 is a timeline showing media units of an altered media stream.

FIG. 10 illustrates a timeline showing a sequence of four sequential units or frames as "X" marks along the time line. These represent units of the original media stream. In this example, the middle two original frames 1002 can be replaced by a single replacement frame 1004, shown as an "O", at a presentation time that is at the midpoint between the presentation times of the two original frames 1002. This replacement frame can be derived from the original two frames 1002 in several different ways. For example, the new frame can be calculated by averaging the two original frames. The advantage of this method is its low computational complexity. In certain circumstances, it has the added benefit of both noise removal and visual enhancement.

However, this method does not always work well when there is high motion between frames.

A more complex method is to generate the replacement frame by interpolating, using motion vectors of the surrounding original frames. This method is susceptible to variations in quality, but may be necessary if there is a relatively high degree of motion between the two original frames.

When interpolating using motion vectors, it is possible to use motion vectors from the encoded MPEG data stream. However, at the cost of even more complexity, better results can be obtained by determining actual motion vectors from the decoded video stream. When using this method, motion vectors are determined using a fine-grained search around both the motion vectors of macroblocks as well as the zero motion vector.

Increasing the number of video frames can be accomplished in essentially the same manner, by replacing a first number of frames with a second, plural number of frames, where the second number is greater than the first number. For example in FIG. 10, the original frames 1002 are replaced with three frames that include original frames 1002 and new frame 1004. The new frames can be calculated by averaging or interpolating based on adjacent or surrounding frames of the original media stream, as already described.

The particular method of increasing or decreasing the number of video frames in a received video stream in many cases will be dictated by the available processing capabilities of the device being used to render the streams. In some cases, it may be possible to monitor resource usage: to use the more complex methods when sufficient computational resources are available, and to use less complex methods when fewer computational resources are available.

After creating new frames to increase or decrease the number of frames in a video stream, appropriate post-processing is performed, including post-filtering, blending, and de-blocking.

For further information regarding techniques for generating frames using motion estimation, motion vectors, and interpolation, please refer to the following references:

B. Choi et al., "New Frame Rate Up-Conversion using Bi-Directional Motion Estimation," IEEE Transactions on Consumer Electronics, Vol. 46, No. 3, August, 2000, pp. 603–609.

Y.-K. Chen et al., "Frame Rate Up-Conversion Using Transmitted True Motion Vectors," Proceedings of 1998 Workshop on Multimedia Signal Processing, December 1998.

Jenq-Neng Hwang et al., "Dynamic Frame Skipping in Video Transcoding," Proceedings of IEEE Workshop Multimedia Signal Proc., December 1998, Redondo Beach, Calif.

Dong-Wook Kim et al., "A New Video Interpolation Technique Based on Motion-Adaptive Subsampling," IEEE Transactions on Consumer Electronics, Volume 45, Issue 3, August 1999, pp. 782–787.

P. Delogne, et al, "Improved Interpolation, Motion Estimation, and Compensation for Interlaced Pictures," IEEE Transactions on Image Processing, Vol 3, No. 5, September 1994, pp 482–491.

E. B Bellers et al, "Advanced Motion Estimation and Motion Compensated Deinterlacing," in Proc. Int. Workshop HDTV, Los Angeles, Calif., October 1996, Session A2.

G. De Haan, et al, "Sub-Pixel Motion Estimation with 3D Recursive Search Block Matching," Signal Processing: Image Communication, pp 229–239, 1994.

G. De Haan, et al., "True-Motion Estimation with 3-D Recursive Search Block Matching," IEEE Transactions on Circuits and Systems for Video Technology, Vol. 3, No. 5, October 1993, pp. 368–379.

E. Dubois, et al, "Motion Estimation and Compensation Technologies for Standards Conversion," Signal Processing: Image Communication, No. 6, pp 189–192, 1994.

In an audio stream, alteration for purposes of increasing or decreasing the number of samples can be accomplished using various audio resampling techniques. A particularly effective method of audio resampling (which can also be used to alter video streams) is described in a copending U.S. patent application entitled "Method and Apparatus for Resampling Data," by inventor Shankar Moni, filed concurrently herewith, and having Ser. No. 10/158,694, the disclosure of which is hereby incorporated by reference.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of synchronizing a received media stream, comprising:

repeatedly determining an urgency measure indicating a degree by which a nominal rate at which the media stream is received is out of synchronization with a rendering rate at which the media stream is to be output, wherein the rendering rate is established by a reference signal;

repeatedly determining favorability measures corresponding to points in the received media stream, each favorability measure indicating the relative favorability of altering the received media stream at the corresponding point so as to output the media at the rendering rate;

selecting points in the received media stream at which to alter the received media stream based on both the urgency measure and the favorability measures;

altering the received media stream at the selected points in a manner that reduces the degree by which the received media stream is out of synchronization.

2. A method as recited in claim 1, further comprising buffering units of the received media stream prior to rendering them, wherein determining the urgency measure comprises evaluating how many units of the received media stream are currently buffered.

3. A method as recited in claim 1, wherein the selecting comprises:

selecting the points based on whether the points have corresponding favorability measures that satisfy a variable favorability threshold.

4. A method as recited in claim 1, wherein the selecting comprises:

selecting the points based on whether the points have corresponding favorability measures that satisfy a variable favorability threshold; and lowering the favorability threshold as the urgency measure increases and raising the favorability threshold as the urgency measure decreases.

5. A method as recited in claim 1, wherein determining the favorability measures comprises reading such favorability measures directly from data associated with the received media stream.

6. A method as recited in claim 1, wherein determining the favorability measures comprises receiving the favorability measures along with the received media stream.

7. A method as recited in claim 1, wherein determining the favorability measures is based on ancillary data associated with the received media stream.

8. A method as recited in claim 1, wherein determining the favorability measures is based on ancillary production data associated with the received media stream.

9. A method as recited in claim 1, wherein determining the favorability measures comprises calculating the favorability measures from data associated with the received media stream.

10. A method as recited in claim 1, wherein the media stream is an MPEG media stream and determining the favorability measures comprises calculating the favorability measures from MPEG data associated with the received media stream.

11. A method as recited in claim 1, wherein:
the received media stream has sequential video frames;
each frame potentially has a number of non-intra-coded blocks; and
determining each favorability measure comprises calculating a function of the number of non-intra-coded blocks in a frame of the received media stream.

12. A method as recited in claim 1, wherein:
the received media stream has sequential video frames;
each frame potentially has one or more motion vectors and a number of non-intra-coded blocks; and
determining each favorability measure comprises calculating a function of the motion vectors in a frame of the received media stream and the number of non-intra-coded blocks in said frame.

13. A method as recited in claim 1, wherein:
the received media stream has sequential video frames;
each frame potentially has one or more non-intra DCT coefficients and a number of non-intra-coded blocks; and
determining each favorability measure comprises calculating a function of the non-intra DCT coefficients of a frame of the received media stream and the number of non-intra-coded blocks in said frame.

14. A method as recited in claim 1, wherein:
the received media stream has sequential video frames;
each frame potentially has a number of non-intra-coded blocks and a number of macroblocks; and
determining each favorability measure comprises calculating a function of the number of non-intra-coded blocks in a frame of the received media stream and the number of macroblocks in said frame.

15. A method as recited in claim 1, wherein determining each favorability measure comprises calculating a function of at least two of the following parameters of a video frame of the received media stream:
the motion vectors in the frame;
the number of non-intra-coded blocks in the frame;
the absolute values of non-intra DCT coefficients of the frame;
the number of macroblocks in the frame; and
the bit rate of the frame.

16. A method as recited in claim 1, wherein determining each favorability measure comprises calculating a function of at least three of the following parameters of a video frame of the received media stream:
the sum of absolute values of motion vectors in the frame;
the number of non-intra-coded blocks in the frame;
the sum of absolute values of non-intra DCT coefficients of the frame;
the number of macroblocks in the frame; and
the bit rate of the frame.

17. A method as recited in claim 1, wherein determining each favorability measure comprises calculating a function of at least the following parameters of a video frame of the received media stream:
the sum of absolute values of motion vectors in the frame;
the number of non-intra-coded blocks in the frame;
the bit rate of the frame.

18. A method as recited in claim 1, wherein altering the received media stream comprises dropping one or more units.

19. A method as recited in claim 1, wherein altering the received media stream comprises adding one or more duplicate units.

20. A method as recited in claim 1, wherein:
altering the received media stream comprises replacing a first number of units with a different second number of units; and
at least one of the second number of units is based on an average of two or more of the first number of units.

21. A method as recited in claim 1, wherein:
altering the received media stream comprises replacing a first number of frames with a different second number of frames; and
at least one of the second number of frames is interpolated from two or more of the first number of frames.

22. A method as recited in claim 1, wherein:
altering the received media stream comprises replacing a first number of frames with a different second number of frames; and
at least one of the second number of frames is interpolated using motion vectors from two or more of the first number of frames.

23. A media stream processing system comprising:
a first decoder for receiving sequential units of a first media stream having a first nominal rendering rate, and for outputting a first decoded media stream;
a first buffer for receiving and storing the first decoded media stream;
at least a second decoder receiving sequential units of a second media steam having a second nominal rendering rate, and for outputting a second decoded media stream;
at least a second buffer for receiving and storing the second decoded media stream;
wherein the first decoder is configured to send a logical reference signal to the first and second buffers;
synchronization logic coupled to the second buffer for rendering the sequential units of the second media stream at an actual rendering rate equal to the first nominal rendering rate, wherein the actual rendering rate is controlled by the logical reference signal;
wherein the synchronization logic is coupled to the second buffer and is adapted to:
repeatedly determine an urgency measure indicating a degree by which the rendering of the second media stream is out of synchronization with the logical reference signal;
repeatedly evaluate the second media stream to determine favorability measures corresponding to points in the second media stream, each favorability measure indicating the relative favorability of altering the second media stream at the corresponding point;

select points in the second media stream at which to alter said the second media stream based on both the urgency measure and the favorability measures; and alter the second media stream at the selected points in a manner that reduces the degree by which the rendering of the second media stream is out of synchronization.

24. A media stream processing system as recited in claim 23, wherein said rendering comprises rendering one of the media streams within the other of the media streams.

25. A media stream processing system as recited in claim 23, wherein said altering comprises changing the number of units of the second media stream prior to rendering said at least one of the media streams.

26. A media stream processing system as recited in claim 23, wherein said altering comprises adding units to the second media stream prior to rendering the second media stream.

27. A media stream processing system as recited in claim 23, wherein said altering comprises removing units from the second media stream prior to rendering the second media stream.

28. A media stream processing system as recited in claim 23, wherein:

altering the second media stream comprises replacing a first number of units with a different second number of units; and at least one of the second number of units is based on two or more of the first number of units.

29. A media stream processing system as recited in claim 23, further comprising buffering units of the second media stream prior to rendering the units, wherein evaluating units of the second media stream to determine favorability measures comprises evaluating how many units of the second media stream are currently buffered.

30. A media stream processing system as recited in claim 23, wherein the selecting comprises:

selecting the points based on whether the points have corresponding favorability measures that satisfy a variable favorability threshold;

lowering the favorability threshold as the urgency measure increases and raising the favorability threshold as the urgency measure decreases.

31. A media stream processing system as recited in claim 23, wherein the media stream is an MPEG media stream and evaluating units of the second media stream to determine favorability measures comprises calculating the favorability measures from MPEG data associated with the second media stream.

32. A media stream processing system as recited in claim 23, wherein:

each received unit potentially has a number of non-intra-coded blocks; and evaluating units of the second media stream to determine favorability measures comprises calculating a function of the number of non-intra-coded blocks in a unit of the second media stream.

33. A media stream processing system as recited in claim 23, wherein:

each unit potentially has one or more motion vectors and a number of non-intra-coded blocks; and evaluating units of the second media stream to determine favorability measures comprises calculating a function of the motion vectors in a unit of the second media stream and the number of non-intra-coded blocks in said unit.

34. A media stream processing system as recited in claim 23, wherein:

each unit potentially has one or more non-intra DCT coefficients and a number of non-intra-coded blocks; and determining each favorability measure comprises calculating a function of the non-intra DCT coefficients of a unit of the second media stream and the number of non-intra-coded blocks in said unit.

35. A media stream processing system as recited in claim 23, wherein:

each unit potentially has a number of non-intra-coded blocks and a number of macroblocks; and determining each favorability measure comprises calculating a function of the number of non-intra-coded blocks in a unit of the second media stream and the number of macroblocks in said unit.

36. A media stream processing system as recited in claim 23, wherein evaluating units of the second media stream to determine favorability measures comprises calculating a function of at least two of the following parameters of a frame of the second media stream:

the sum of absolute values of motion vectors in the frame;
the number of non-intra-coded blocks in the frame;
the sum of absolute values of non-intra DCT coefficients of the frame;
the number of macroblocks in the frame; and
the bit rate of the frame.

37. A media stream processing system as recited in claim 23, wherein evaluating units of the second media stream to determine favorability measures comprises calculating a function of at least three of the following parameters of a frame of the second media stream:

the sum of absolute values of motion vectors in the frame;
the number of non-intra-coded blocks in the frame;
the sum of absolute values of non-intra DCT coefficients of the frame;
the number of macroblocks in the frame; and
the bit rate of the frame.

38. A media stream processing system as recited in claim 23, wherein evaluating units of the second media stream to determine favorability measures comprises calculating a function of at least the following parameters of a frame of the second media stream:

the sum of absolute values of motion vectors in the frame;
the number of non-intra-coded blocks in the frame;
the bit rate of the frame.

39. One or more computer-readable media comprising instructions that are executable by a computer to perform actions comprising:

receiving sequential units of a media stream, the media stream having a nominal rendering rate;

buffering the received units in a buffer;

rendering the units from the buffer at an actual rendering rate that is potentially different than the nominal rendering rate, wherein the actual rendering rate is established by a reference signal;

repeatedly evaluating the buffered units to determine an urgency measure indicating a degree by which the nominal rendering rate is out of synchronization with the actual rendering rate;

repeatedly determining favorability measures corresponding to points in the buffered media stream, each favorability measure indicating the relative favorability of changing the number of units in the buffered media stream at the corresponding point so as to render the media at the actual rendering rate;

selecting one or more points in the buffered media stream at which to change the number of units, wherein said selecting is based on both the urgency measure and the favorability measures;

changing the number of units in the buffered media stream at the selected one or more points.

40. One or more computer-readable media as recited in claim 39, wherein the selecting comprises:

selecting the points based on whether the points have corresponding favorability measures that satisfy a variable favorability threshold;

lowering the favorability threshold as the urgency measure increases and raising the favorability threshold as the urgency measure decreases.

41. One or more computer-readable media as recited in claim 39, wherein determining the favorability measures comprises receiving the favorability measures along with the received media stream.

42. One or more computer-readable media as recited in claim 39, wherein:

each unit potentially has a number of non-intra-coded blocks; and determining each favorability measure comprises calculating a function of the number of non-intra-coded blocks in a unit of the received media stream.

43. One or more computer-readable media as recited in claim 39, wherein:

each unit potentially has one or more motion vectors and a number of non-intra-coded blocks; and determining each favorability measure comprises calculating a function of a sum of the absolute values of the motion vectors in a unit of the received media stream and the number of non-intra-coded blocks in said unit.

44. One or more computer-readable media as recited in claim 39, wherein:

each unit potentially has one or more non-intra DCT coefficients and a number of non-intra-coded blocks; and determining each favorability measure comprises calculating a function of a sum of the non-intra DCT coefficients of a unit of the received media stream and the number of non-intra-coded blocks in said unit.

45. One or more computer-readable media as recited in claim 39, wherein:

each unit potentially has a number of non-intra-coded blocks and a number of macroblocks; and determining each favorability measure comprises calculating a function of the number of non-intra-coded blocks in a unit of the received media stream and the number of macroblocks in said unit.

46. One or more computer-readable media as recited in claim 39, wherein determining each favorability measure comprises calculating a function of at least two of the following parameters of a frame of the received media stream:

the sum of absolute values of motion vectors in the frame;

the number of non-intra-coded blocks in the frame;

the sum of absolute values of non-intra DCT coefficients of the frame;

the number of macroblocks in the frame; and the bit rate of the frame.

47. One or more computer-readable media as recited in claim 39, wherein determining each favorability measure comprises calculating a function of at least three of the following parameters of a frame of the received media stream:

the sum of absolute values of motion vectors in the frame;

the number of non-intra-coded blocks in the frame;

the sum of absolute values of non-intra DCT coefficients of the frame;

the number of macroblocks in the frame; and the bit rate of the frame.

48. One or more computer-readable media as recited in claim 39, wherein determining each favorability measure comprises calculating a function of at least the following parameters of a frame of the received media stream:

the sum of absolute values of motion vectors in the frame;

the number of non-intra-coded blocks in the frame;

the bit rate of the frame.

49. One or more computer-readable media as recited in claim 39, wherein:

changing the number of units in the buffered media stream comprises replacing a first number of units with a different second number of units; and at least one of the second number of units is based two or more of the first number of units.

50. One or more computer-readable media as recited in claim 39, wherein:

changing the number of units in the buffered media stream comprises replacing a first number of units with a different second number of units; and at least one of the second number of frames is based on an average of two or more of the first number of units.

51. One or more computer-readable media as recited in claim 39, wherein:

changing the number of units in the buffered media stream comprises replacing a first number of units with a different second number of units; and at least one of the second number of units is interpolated from two or more of the first number of units.

52. One or more computer-readable media as recited in claim 39, wherein:

changing the number of units in the buffered media stream comprises replacing a first number of units with a different second number of units; and at least one of the second number of frames is interpolated using motion vectors from two or more of the first number of units.

* * * * *